A. J. Bowers.
Column.

N° 22,542.    Patented Jan. 11, 1859.

Witnesses
Thomas H. Powell,
A. Guenther.

Inventor
A. J. Bowers

UNITED STATES PATENT OFFICE.

A. J. BOWERS, OF RICHMOND, VIRGINIA.

MODE OF SECURING TOGETHER THE SIDES OF CAST METAL COLUMNS.

Specification of Letters Patent No. 22,542, dated January 11, 1859.

*To all whom it may concern:*

Be it known that I, A. J. BOWERS, of Richmond, in the county of Henrico and State of Virginia, have invented a new and Improved Mode of Securing Together the Sides of Cast Metal Columns; and I do hereby declare that the following is a full, clear, and exact description of the same, reference being had to the annexed drawings, making a part of this specification, in which—

Figure 1:
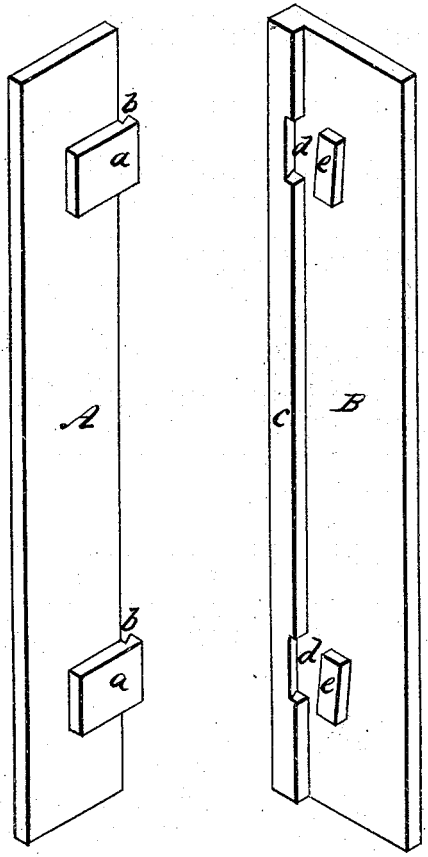
Figure 2:
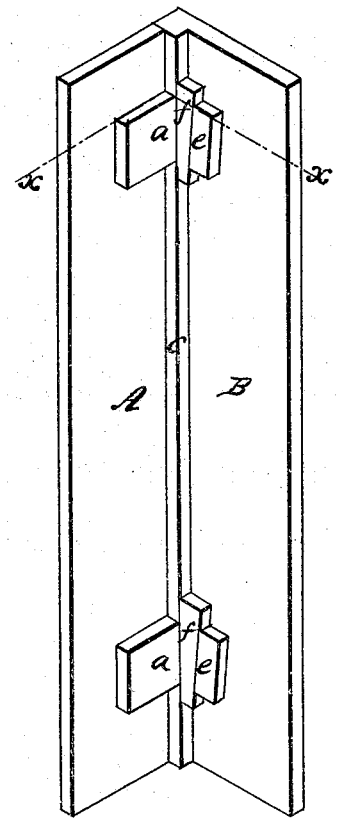
Figure 3:
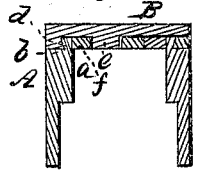

Figure 1, is a perspective view showing two sides of a column detached, but constructed to be secured together according to my invention. Fig. 2, is also a perspective view, showing two sides of a column secured together according to my invention. Fig. 3, is a horizontal section of ditto, taken in the line $x$, $x$, Fig. 2.

Similar letters of reference indicate corresponding parts in the several figures.

The object of this invention is to procure a fastening whereby the sides of a cast metal column may be secured together with great facility and a strong, durable and straight joint obtained.

In casting rectangular metal columns for the front of iron buildings, and other purposes, it is extremely difficult to get the columns, when cast whole, of equal thickness. There will be most generally a preponderance of metal on one side or another, so as to produce an unequal shrinkage and a consequent warping of the column, making it extremely difficult to match or fit the same to its adjoining parts. To remedy this, columns have been cast with detached sides, the sides being secured together by bolts passing through ears on the sides, but this plan is attended with some difficulty, the ears, if the plates or sides are not straight, are liable to break off in securing the plates or sides together and the sides cannot be readily secured together. I overcome these difficulties as follows:

In Figs. 1, and 2, A, B, represent two plates or sides of a column. On the plate A, two or more, as may be wanted, ledges or projections $a$, $a$, are cast, one near each end, at its inner side. These ledges extend outward a suitable distance from the plate and a dovetail notch or recess $b$, is formed in the outer side of each adjoining the edge of the plate or side A, see Figs. 1, and 3.

The plate B, has a continuous ledge $c$, formed or cast at one edge, and at its inner side. This ledge has two or more notches or recesses $d$, $d$, in it, said recesses being of dovetail form corresponding to the projections $a$, see Figs. 1 and 3. On the plate B, near the ledge $c$, and at a point corresponding to the position of the projections $a$, $a$, on the plate A, there are two projections $e$, $e$, one side of each of which, the side facing the ledge $c$, is beveled or made inclined, as shown clearly in Figs. 1, and 2.

The two sides A, B, are secured together by fitting the projections $a$, of the plate A, in the notches $d$, of the plate B, the edge of the plate A, bearing against the ledge $c$, see Fig. 2. Wedges or keys $f$, which may be of wrought iron are then driven down between the projections $e$, $e$, and $a$, $a$, and the two sides are firmly secured together.

It will be understood, of course, that in three or four sided columns, the opposite edges of the plates are provided respectively with the projections $a$, $a$, and ledge $c$, see Fig. 3, in which a third side is shown in red. A fourth side would of course correspond to the plate B.

By this improvement the plates or sides of the column are permanently secured together and a close joint obtained. The plates or sides may be very readily attached and without danger of breaking or injuring any of the parts.

I would remark that in large columns intermediate fastenings may be employed, as many as may be required in order to bind the parts firmly together.

Having thus described my invention, what I claim as new and desire to secure by Letters Patent, is—

Securing the plates or sides of metal columns together, by means of the projections $a$, $a$, $e$, $e$, ledge $c$, provided with notches $d$, and the wedges $f$, $f$, substantially as shown and described.

A. J. BOWERS.

Witnesses:
THOMAS H. POWELL,
A. GUENTHER.